United States Patent [19]
Langos et al.

[11] Patent Number: 5,460,504
[45] Date of Patent: Oct. 24, 1995

[54] STORAGE HEAD FOR A BLOW MOLDING MACHINE

[75] Inventors: Peter Langos, St. Augustin; Manfred Lehmann, Cologne, both of Germany

[73] Assignee: Mauser-Werke GmbH, Bruhl, Germany

[21] Appl. No.: 109,761

[22] Filed: Aug. 20, 1993

Related U.S. Application Data

[63] Continuation of Ser. No. 828,977, Mar. 30, 1992, Pat. No. 5,256,049.

[51] Int. Cl.⁶ .................................................. B29C 47/20
[52] U.S. Cl. ...................... 425/131.1; 425/381; 425/467; 425/532
[58] Field of Search ................. 425/131.1, 133.1, 425/381, 523, 532, 467

[56] References Cited

U.S. PATENT DOCUMENTS

| | | | |
|---|---|---|---|
| 3,909,183 | 9/1975 | Hsu | 425/532 X |
| 3,985,490 | 10/1976 | Kader | 425/381 |
| 4,063,865 | 12/1977 | Becker | 425/467 |
| 4,182,603 | 1/1980 | Knittel | 425/133.1 |
| 4,201,532 | 5/1980 | Cole | 425/467 X |
| 4,305,902 | 12/1981 | Uhlig | 425/532 X |
| 4,422,838 | 12/1983 | Iwawaki et al. | 425/467 X |
| 4,424,178 | 1/1984 | Daubenbuchel et al. | 425/381 X |
| 4,548,569 | 10/1985 | Pitigliano et al. | 425/133.1 |
| 4,609,340 | 9/1986 | Irwin et al. | 425/532 |
| 4,731,216 | 3/1988 | Topolski | 425/523 X |
| 4,802,833 | 2/1989 | Shapler | 425/131.1 |
| 5,116,215 | 5/1992 | Hsu | 425/381 |
| 5,204,120 | 4/1993 | Hirschberger | 425/133.1 X |
| 5,206,032 | 4/1983 | Bock | 425/532 X |
| 5,256,049 | 10/1993 | Langos et al. | 425/131.1 |
| 5,256,051 | 10/1993 | Langos et al. | 425/133.1 |

FOREIGN PATENT DOCUMENTS

| | | | |
|---|---|---|---|
| 1964675 | 12/1969 | Germany . | |
| 2046334 | 3/1972 | Germany . | |
| 2239987 | 2/1974 | Germany . | |
| 3000444 | 7/1981 | Germany . | |
| 3026822 | 1/1982 | Germany . | |
| 3623308 | 1/1988 | Germany | 425/532 |
| 5590329 | 7/1980 | Japan | 425/532 |
| 5985720 | 5/1984 | Japan . | |

*Primary Examiner*—Richard L. Chiesa
*Attorney, Agent, or Firm*—Pennie & Edmonds

[57] ABSTRACT

The invention relates to a storage head for a blow moulding machine for discontinuous manufacture of multi-layer co-extruded and blow-moulded hollow bodies made of thermoplastic. To improve the product quality and to increase the throughput, each distributor element is designed as a spiral channel distributor (20) which distributes the individual molten plastic streams uniformly at the periphery. The ejector (14) consists of at least two concentric tubular pieces (42, 44) and the peripherally distributed plastic flows from the ejector (14) through an annular gap (46) into the storage space (16) in the storage head housing (10) below the ejector.

25 Claims, 2 Drawing Sheets

STORAGE HEAD FOR A BLOW MOLDING MACHINE

RELATED APPLICATION

This application is a continuation of application Ser. No. 07/828,977, filed Mar. 30, 1992, and now U.S. Pat. No. 5,256,049.

FIELD OF THE INVENTION

The invention relates to a storage head for a blow molding machine for the discontinuous production of plastic hollow bodies, comprising at least one extruder, connected to the storage-head housing, for feeding at least one liquid plastic melt into the storage head; a centrally disposed shaft; and a distributor element, formed as a spiral channel and enclosing the shaft concentrically, to distribute the plastic melt over a circular circumference and conducting it into an annular storage space underneath the ejector piston, which is mounted in the storage-head housing so as to be movable axially, and by means of which the plastic melt stored in the storage space can be ejected by an annular nozzle gap which connects underneath to the storage space.

BACKGROUND OF THE INVENTION

A comparable storage head is previously known, e.g., from the DE-OS 30 00 444, and is described in detail there. The spiral-channel distributor to distribute the liquid plastic melt is here disposed on the outside wall of the ejector piston. The spiral-shaped channel is supplied with liquid plastic melt through two axial grooves that are disposed in the outside wall of the ejector piston above the spiral channel. These axial grooves are connected to appropriate radial borings in the storage housing so as to feed in material from the extruder. A disadvantage here is that, when the plastic is distributed over the circumference, such that the storage space is filled up and the ejector piston moves slowly and steadily into its upper ejector position, the spiral-channel distributor is bounded by two outside walls that move relative to one another, and the inflowing plastic material is constantly subject to a shear effect. Furthermore, during the ejection process, there is no defined ejector edge present at the outside circumference of the ejector piston, so that the entire plastic ring column in the storage space adheres on its outside to the inside wall of the storage housing and is not ejected uniformly over the entire cross-section but rather is displaced to the outside in the manner of a wedge, adheres to the storage housing, and is sheared off or smeared off. This causes undesirable material displacements and excessive internal friction as well as a non-uniform pressure build-up within the liquid melted plastic material. The result is a disturbed layer build up in the hose-shaped parison that is ejected through the annular-gap nozzle of the storage head, or in the blown plastic hollow body or in the end product.

These disadvantages should be avoided.

SUMMARY OF THE INVENTION

It is consequently an object of the present invention to improve the quality of the blown hollow bodies, such as, e.g., barrels or canisters, and for this purpose to create a favorable layer build-up with multiple overlaps of the plastic material in the storage head through a distributor element that is designed as a spiral-channel distributor, and to be able to eject this plastic ring column completely and uniformly without disturbing the interior layer build-up.

According to the invention, this object is achieved as follows: The ejector piston is formed of at least two cylindrical tubular pieces, and the spiral channels of the spiral-channel distributor are formed on one tubular piece and are covered by the other tubular piece, such that the plastic which is distributed on the circumference of the cylinder exits from a annular gap that is formed on the front face in the ejector piston to define a material outlet.

By constructing the ejector piston in this favorable fashion, the spiral-channel distributor is formed, so to speak, within the ejector piston itself with a stationary outer boundary of the spiral-channel gap. The plastic material is uniformly distributed along the circumference and it flows into the storage space on the front side from the oscillating ejector piston and the distributor space of the spiral-channel distributor is not formed by boundary walls that are in constant relative motion with respect to one another. A shear effect and internal friction on the plastic material is thus already avoided when the material is distributed along the circumference. Furthermore, the same conditions prevail for the ejector piston itself. The storage space is bounded by the ejector piston in the circumferential direction completely smoothly and at about the same height on both sides (outside wall of the shaft and inside wall of the storage-head housing as well as the lower inside edge and outside edge of the ejector piston). Thus, no non-uniform shear surfaces are present even during the ejection process, and no non-uniform shear forces can act on the stored plastic material.

Through the spiral-channel distributor that is disposed in the ejector piston, the liquid melted plastic is advantageously distributed over the circumference in several thin layers that alternately are superposed or overlapped; this favorable layer build-up is not disturbed when the material is distributed in the distributor space and when it is ejected from the storage space through a nozzle gap which connects underneath to the annular collection chamber or storage space. Thus, the blown product is free from the undesirable formation of striations, and the material or the individual layers are welded together not only on radial borders over the wall thickness or a narrow overlapping area, but in several thin layers over the entire circumference. This considerably improves the product quality of the blown hollow body.

For technical and production reasons, it may be advantageous here for the outer and/or inner cylindrically shaped tubular piece of the ejector piston to be formed in two shells, i.e. to consist of two shell halves.

It is a special feature of the invention that the spiral channel distributor is formed on the outside wall of the inside tubular piece or/and on the inside wall of the outer tubular piece of the ejector piston. Here, the length of the distributor element or of the individual spiral channels in the axial direction is about the same as the diameter of the tubular piece on which the spirals are formed. With this storage head for a blow molding machine for the discontinuous production of plastic hollow bodies and with this distributor element that is designed as a spiral-channel distributor, the same rheological flow properties are given for all plastic particles and improved overlap and distribution of the melt streams in the distributor element is achieved while simultaneously increasing the throughput power and the production speed.

The spiral-channel distributor can be compared to a multiple-start thread or spiral channel with a particular pitch, that is formed on the outside wall of the inside tubular piece or on the inside wall of the outside tubular piece. The spiral channels are always fed individually, and their depth decreases continuously in the flow direction. In this way, the plastic streams present in the spirals are gradually brought over into axial streams. The axial streams form as circumferential shells in the enlarging gap between the spiral-channel distributor and the sheath which covers it. The axially outflowing streams of melt from the individual spiral channels always overlap the residual axial streams of melt which flow underneath and which flow in the spiral channels.

A special development of the invention provides that the spirals of the spiral-channel distributor are supplied with liquid melted plastic at least along one longitudinal groove. Here, the longitudinal groove is disposed at about the same height as the spirals, and the longitudinal groove stands in a material flow connection, underneath with the extruder by way of a radial boring, and above with the beginning of the spirals. Here, the liquid melted plastic material is thus conducted through two or four laterally disposed infeed grooves, directly through the storage-head housing-wall, to the beginning or the start of the individual channels in the ejector piston. Because the longitudinal grooves are disposed at about the same height as the spirals, and because the longitudinal grooves stand in a material flow connection, underneath with the extruder by way of a radial boring, and above with the beginning of the spirals, the structural height of the distributor element is advantageously shortened.

The inventive spiral-channel distributor achieves the following advantages:

far-reaching overlap of the individual melt streams or layers with only one melt distributor, overlap length beyond half the circumference up to about 240° in the circumferential direction (important for welding the individual streams; in the case of a design with, e.g., six spirals and 240° overlap length, this leads to four-fold overlap)

the same rheological flow properties hold for all melt streams, a significant increase of throughput power is possible with the inventive spiral-channel distributor, in comparison with conventional distributor elements such as, e.g., a thread-shaped distributor (e.g. a 20 l head storage can achieve an increase of throughput power from 650 kg/h to about 800 kg/h while simultaneously improving the all-around distribution of the plastic material).

BRIEF DESCRIPTION OF THE DRAWINGS

The invention is explained and described in more detail below, in terms of an embodiment which is schematically shown in the following drawings.

DETAILED DESCRIPTION OF THE PREFERRED EMBODIMENTS

Figure 1:
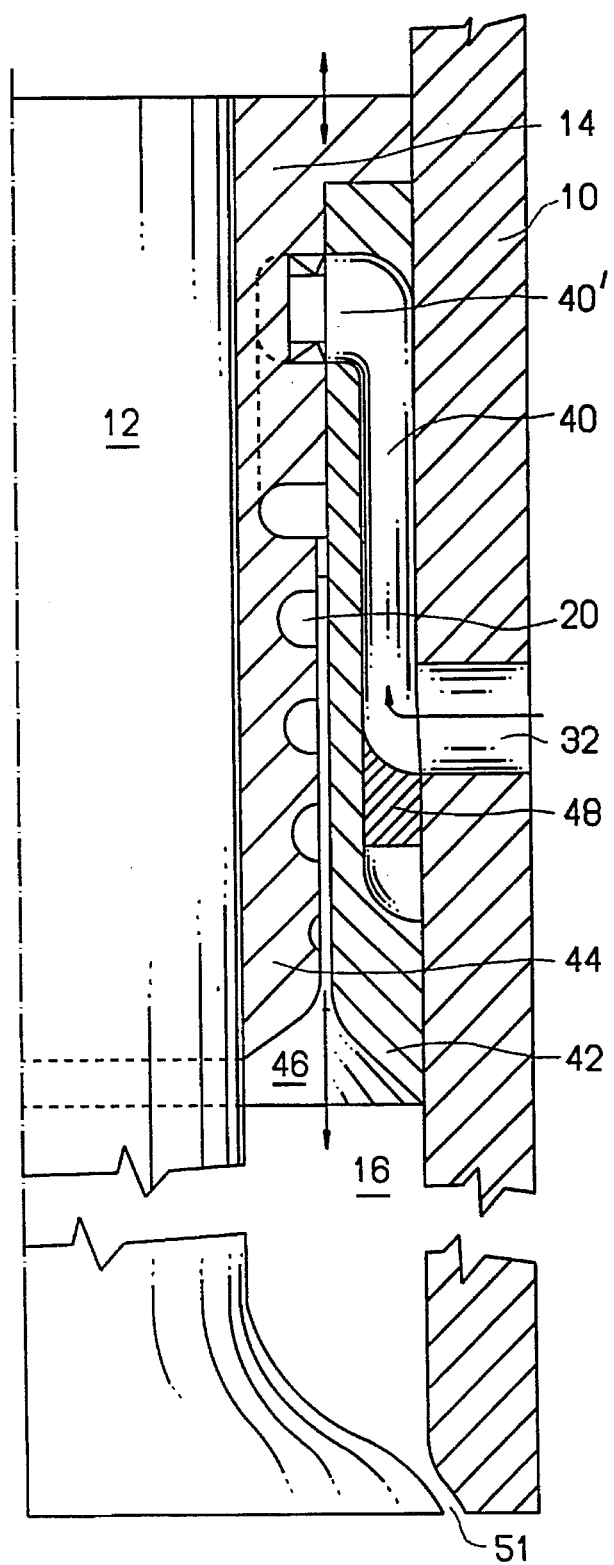
FIG. 1 is a schematic view of one embodiment of the present invention.

In FIG. 1, a storage-head housing of an inventive storage head with a spiral-channel distributor is designated by the reference number 10. Here, the ejector piston 14 consists of two concentric tubular pieces 42 and 44. The tubular piece 42 defines an inner sleeve member while the tubular piece 44 defines a tubular inner body member received within the sleeve member. The lower ends of the inner and outer tubular pieces define the front face of the ejector and are sloped radially inwardly and outwardly, respectively. The outer wall of the inner body member tubular piece 44 is equipped with the helical channels or spirals 20 of the spiral-channel distributor. These spirals decrease in depth, and the gap between the two tubular pieces 42 and 44 becomes wider. For operation, the two tubular pieces 42 and 44 are rigidly connected together.

Figure 2:
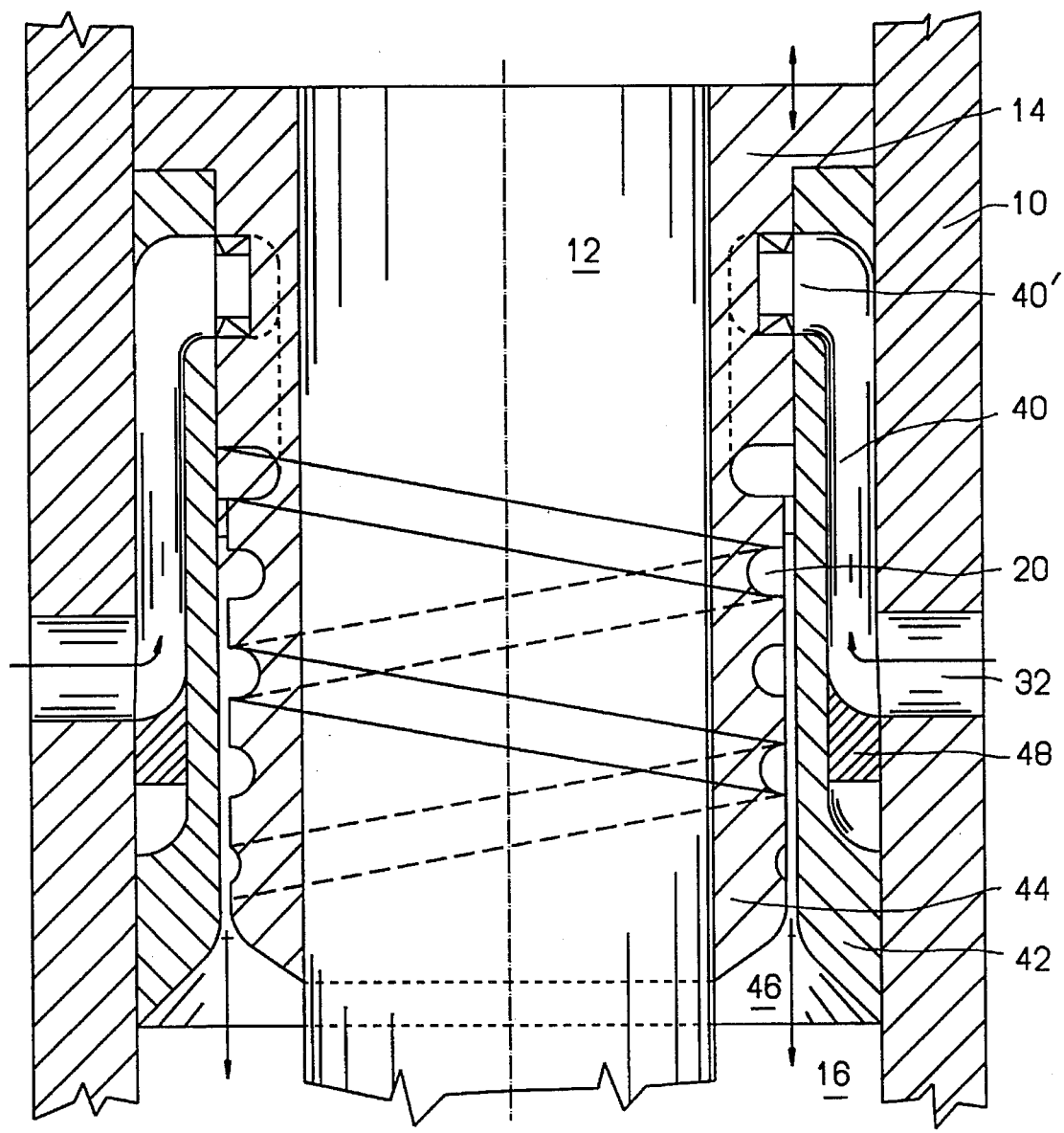
FIG. 2 is a schematic view of another embodiment of the present invention.

Two or four diametrically opposite material inlet bore means or borings 32 are situated in the housing wall 10 of the storage head. FIG. 1 shows an embodiment with one boring while FIG. 2 shown an embodiment with two borings. Through appropriate pipelines, they are connected to at least one extruder to supply the liquid melted plastic. In the representation that is shown in the drawing, the ejector piston 14 has reached its uppermost position; here, the lower end of the longitudinal groove 40, which is formed in the outer wall of the outer tubular piece 42, goes over directly into the radial boring 32 in the housing wall 10 of the storage-head housing. The length of the axial groove 40 corresponds approximately to the length of the ejection stroke of the ejector piston 14. In its lowermost ejection position, the upper end of the longitudinal groove 40 is situated almost directly in front of the radial boring 32.

The liquid melted plastic material supplied by the extruder flows through the boring 32 and through the longitudinal groove 40 towards the top. There it passes through radially inwardly directed flow aperture or bore means in the form of a radial boring 40, in the radial direction above the spiral-channel distributor into the inner tubular piece 44. Here, a spiral can be fed directly, or two spirals can be supplied with plastic material simultaneously through a divider channel that is bounded in the circumferential direction and that runs horizontally.

At first, the main stream of the plastic material flows in the individual spirals in helical fashion in the direction of the spirals. However, at the same time, a portion of the plastic melt to an increasing degree "overflows" in shell-like fashion in the circumferential and axial directions from the individual spirals, and overlaps in shell-like fashion. Finally, the plastic material, which is uniformly distributed over the entire circumference, exits at the front between the two tubular pieces 42 and 44 from the spiral-channel distributor and passes through an annular gap 46 into the storage space 16 which is situated below the ejector piston 14. From here, it is ejected through the annular nozzle gap when the ejector piston is moved to its lowermost ejection position.

A clearance hook 48 may be provided in each of the longitudinal grooves 40, below the radial boring, so as to be rigidly connected to the housing wall 10. This clearance hook prevents the plastic material from depositing in the longitudinal groove that is situated underneath the boring 32, so as to separate itself from the continuous stream of melt, and from being pressed out again only during the next filling process of the storage space.

In a modification of the invention, the longitudinal groove 40 can just as well be formed on the inner wall of the storage-head housing 10, so that the liquid melted plastic material reaches the beginning of the spirals or the spiral-channel distributor only through a boring in the outer ring piece 42. The spirals 20 of the spiral-channel distributor here could also be disposed on the cylindrical inside surface Of the outer tubular piece 42.

In another design of the invention, it is likewise conceivable that the liquid melted plastic material is conducted centrally, e.g. through the central piece or the shaft 12, on which the ejector piston 14 is mounted so as to be axially movable. After this, it can be conducted through appropriate star-shaped borings and through longitudinal grooves connecting thereto, as stroke equalization, into the spiral-channel distributor that is situated inside the ejector piston.

It is likewise possible to dispose the spirals of the spiral-channel distributor on the outer wall of the inner tubular piece 44 and, formed in appropriately similar fashion, also on the inner wall of the outer tubular piece 42. For production engineering, it is then advantageous, in some circumstances, if the outer tubular piece 42 consists of two hemishells.

It is always essential for the design of the spiral channels that the individual spirals are disposed at some distance from one another, such that their average distance has about the same axial width as the width of one spiral groove, and the width of the spiral grooves increases slowly but steadily with increasing length. Here, the cylindrical area that lies in between increases and becomes broader correspondingly. The spiral grooves are bounded laterally by defined edges, such that the lower edge or the cylindrical surface that connects below is always set back a little, so that the plastic stream can flow over from the spiral groove into the cylindrical circumferential surface.

The above description makes clear that, by means of the inventive design of a storage-head housing with a spiral-channel distributor, plastic hollow bodies can be produced with improved product quality while simultaneously increasing the production speed.

| LIST OF REFERENCE NUMBERS | |
|---|---|
| 10 | storage-head housing |
| 12 | shaft |
| 14 | ejector piston |
| 16 | storage space |
| 20 | spiral-channel distributor |
| 32 | boring (10) to the extruder |
| 40 | longitudinal groove (42) |
| 42 | outer tubular piece (14) |
| 44 | inner tubular piece (14) |
| 46 | annular gap (14) |
| 48 | clearing hook (stripping finger) |

We claim:

1. An accumulator head for an extrusion-blow molding machine, said accumulator head comprising:
   a) a tubular outer cylindrical housing having a housing wall and a housing inner surface, the outer housing including a material inlet and a material outlet;
   b) an annular inner sleeve member slidably received within the outer housing for movement along the housing inner surface, the inner sleeve member having an inner sleeve surface and including an external, material-receiving groove in communication with the outer housing material inlet, and at least two radially inwardly directed flow apertures providing communication between the material-receiving groove and the inner surface of the inner sleeve member;
   c) a tubular inner body member received within the inner sleeve member for engagement with the inner sleeve inner surface, the inner body member including a plurality of external helical channels, each channel being in communication with a respective one of the flow apertures in the inner sleeve to provide helical flow passageways between the inner body member and the inner sleeve member; and
   d) said inner sleeve and the inner body member being mounted for simultaneous movement toward the outer housing material outlet to extrude material therethrough.

2. An accumulator head in accordance with claim 1, including a cylindrical mandrel extending through the inner body member, the mandrel having an end positioned opposite the outer housing material outlet to define therewith an annular nozzle gap to form a tubular parison as material exits from the barrel material outlet.

3. An accumulator head in accordance with claim 1, wherein the outer housing material inlet passes laterally through the housing wall.

4. An accumulator head in accordance with claim 1, wherein the external, material receiving groove in the annular inner sleeve member extends longitudinally.

5. An accumulator head in accordance with claim 1, wherein the annular inner sleeve member has an end that includes an outwardly sloping inner wall to define an outwardly diverging surface.

6. An accumulator head in accordance with claim 1, wherein the tubular inner body member includes an inwardly sloping end adjacent the housing outlet to define an enlarging flow area opening between the inner sleeve member and the inner body member.

7. An accumulator head in accordance with claim 1, wherein the tubular inner body member has an outer diameter that diminishes gradually from one end toward the other end.

8. An accumulator head in accordance with claim 1, wherein said inner sleeve and the inner body member are mounted for shifting together axially within the housing to purge collected plasticated material from the housing and through said outer housing material outlet.

9. An accumulator head in accordance with claim 1, including an annular flow collection chamber between the inner sleeve member and the inner body member, the collection chamber communicating with the helical channels to receive individual flows from the channels to provide a unitary annular outlet flow of material.

10. An accumulator head for an extrusion-blow molding machine, said accumulator head comprising:
    a. a tubular outer housing having a housing wall and a housing inner surface, the outer housing including a material inlet bore means and a material outlet nozzle;
    b. a first annular inner tubular piece slidably received within the outer housing for movement along the housing inner surface, the first tubular piece having a first tubular piece inner surface and including an external, material-receiving groove means in communication with the outer housing material bore means, and at least two radially inwardly directed flow bore means providing communication between the material-receiving groove means and the inner surface of the first tubular piece;
    c. a second inner tubular piece received within the first tubular piece for engagement with the first tubular piece inner surface, the second tubular piece including a plurality of external spiral channels, each channel being in communication with a respective one of the flow bore means in the first tubular piece to provide flow passageways between the first tubular piece and the second tubular piece; and
    d. said first tubular piece and said second tubular piece being mounted for simultaneous movement toward the outer housing material outlet nozzle to extrude material therethrough.

11. An accumulator head in accordance with claim 10, including a cylindrical central shaft extending through the second tubular piece, the central shaft having an end positioned opposite the outer housing material outlet nozzle to define therewith an annular nozzle gap to form a tubular parison as material exits from the housing material outlet nozzle.

12. An accumulator head in accordance with claim 10, wherein the outer housing material inlet bore means passes laterally through the housing wall.

13. An accumulator head in accordance with claim 10, wherein the external material receiving groove means in the first annular inner tubular piece extends longitudinally.

14. An accumulator head in accordance with claim 10, wherein the first annular inner tubular piece has an end that includes an outwardly sloping inner wall to define an outwardly diverging surface.

15. An accumulator head in accordance with claim 10, wherein the second inner body tubular piece includes an inwardly sloping end adjacent the housing outlet to define an enlarging flow area opening between the first tubular piece and the second tubular piece.

16. An accumulator head in accordance with claim 10, wherein the second inner body tubular piece has an outer diameter that diminishes gradually from one end toward the other end.

17. An accumulator head in accordance with claim 10, wherein said first tubular piece and the second tubular piece are mounted for shifting together axially within the housing to purge collected plasticated material from the housing and through the material outlet nozzle.

18. An accumulator head in accordance with claim 10, including an annular flow collection gap between the first tubular piece and the second tubular piece, the collection gap communicating with the spiral channels to receive individual flows from the channels to provide a unitary annular outlet flow of material.

19. A storage head for a blow molding machine for the discontinuous production of plastic hollow bodies, comprising:

a) a storage head housing (10);

b) at least one extruder, connected to the storage-head housing, for feeding at least one molten plastic melt into the storage head;

c) a centrally disposed shaft (12);

d) an ejector piston (14) with a front face;

e) a distributor element (20) formed on the ejector piston as a spiral channel and enclosing the shaft concentrically to distribute the plastic melt over a circular circumference and conduct it into an annular storage space (16) underneath the ejector piston, said piston being mounted in the storage-head housing so as to be movable axially, and by means of which the plastic melt accumulated in the storage space can be ejected intermittently;

f) the ejector piston (14) being formed of at least two concentrically disposed inner and outer cylindrical tubular pieces (44, 42) having lower ends disposed at about the same axial position along said shaft to define the front face of said ejector piston;

g) the spiral channels of the spiral-channel distributor (20) being formed on one tubular piece (42, 44) and covered by the other tubular piece (44, 42) with a distribution gap between the two tubular pieces along said spiral channels, in order to distribute the plastic melt along the circumference, and such that the plastic melt which is distributed on the circumference of the cylindrical pieces exits from an annular gap (46) that is formed on the front face in the ejector piston (14), so as to enter into the annular storage space (16); and h) said annular storage space (16) having a top and bottom and axially extending spaced, annular inside and outside walls, said inside wall being defined by an outside wall surface of said shaft (12), said outside wall being defined by an inside wall surface of said storage head housing (10), and said top being defined by lower ends of said tubular pieces (42, 44).

20. The storage head of claim 19 wherein the lower end of inner one of said tubular pieces is tapered radially inwardly in a direction toward said storage space and the lower end of the outer one of said tubular pieces is tapered radially outwardly in a direction toward said storage space.

21. A storage head for a blow molding machine for the discontinuous production of plastic hollow bodies, comprising:

a) a storage head housing (10);

b) at least one extruder, connected to the storage-head housing, for feeding at least one molten plastic melt into the storage head;

c) a centrally disposed shaft (12);

d) an ejector piston (14) with a front face;

e) a distributor element (20) formed on the ejector piston as a spiral channel and enclosing the shaft concentrically to distribute the plastic melt over a circular circumference and conduct it into an annular storage space underneath an ejector piston, said piston being mounted in the storage-head housing so as to be movable axially, and by means of which the plastic melt accumulated in the storage space can be ejected intermittently;

f) the ejector piston (14) being formed of at least two concentrically disposed inner and outer cylindrical tubular pieces (44, 42);

g) the spiral channels of the spiral-channel distributor (20) being formed on one tubular piece (44, 42) and covered by the other tubular piece (42, 44) with a gap between the two tubular pieces along said spiral channels, in order to distribute the plastic melt along the circumference, and such that the plastic melt which is distributed on the circumference of the cylindrical pieces exits from an annular gap (46) that is formed on the front face in the ejector piston (14), so as to enter into the storage space (16); and h) with the length of the spiral channels in the axial direction of said tubular pieces being about equal to the diameter of the tubular piece on which the spiral channels are formed.

22. An accumulator head for an extrusion-blow molding machine, said accumulator head comprising:

a) a tubular outer housing (10) having a housing wall and a housing inner surface, and including material inlet bore means (32) and material outlet nozzle means;

b) a first annular inner tubular piece (42) slidably received within the outer housing for movement along the housing inner surface, the first tubular piece having an inner surface and an external surface and including external, material-receiving groove means (40) on said external surface in communication at one end thereof with the outer housing material bore means and extending longitudinally along the first annular tubular piece to a second end, said first tubular piece further having radially inwardly directed flow bore means (40') communicating with the second end of the material receiving groove means and the inner surface of the first tubular piece;

c) a second inner body tubular piece (44) received within the first tubular piece for engagement with the first tubular piece inner surface, the second tubular piece including external spiral channels (20) in communication with said flow bore means in the first tubular piece to provide flow passageways between the first tubular piece and the second tubular piece;

d) said first and second tubular pieces being mounted for simultaneous movement between a first position with said flow bore means (40') spaced a predetermined distance from said material inlet bore means (32) and a second position adjacent the outer housing material outlet nozzle means (51) to extrude material therethrough;

e) said groove means (40) extending from said flow bore means (40') and past said material inlet bore means (32) when said first and second tubular pieces are in said first position; and f) hook means (48) disposed in said groove means (40) and fixed to the inner surface of said outer housing (10), said hook means being sized and positioned with respect to said material inlet bore means (32) to prevent flow of material in said groove means (40) in a direction away from said flow bore means (40') at any location of said first and second tubular pieces between said first and second positions thereof.

23. A storage head for a blow molding machine for the discontinuous production of plastic hollow bodies, comprising:

a) a storage head housing (10);

b) at least one extruder, connected to the storage-head housing, for feeding at least one molten plastic melt into the storage head;

c) a centrally disposed shaft (12);

d) an ejector piston (14) with a front face;

e) a distributor element (20) formed on said ejector piston (14) as a spiral channel and enclosing the shaft concentrically to distribute the plastic melt over a circular circumference and conduct it into an annular storage space (16) underneath the ejector piston, said piston being mounted in the storage-head housing so as to be movable axially, and by means of which the plastic melt accumulated in the storage space can be ejected intermittently;

f) the ejector piston (14) being formed of at least two concentrically disposed cylindrical tubular pieces (42, 44) with a gap between the two tubular pieces;

g) the spiral channels of the spiral-channel distributor (20) being formed on one tubular piece (42, 44), covered by the other tubular piece (44, 42) and extending from a location adjacent one end of the tubular piece to a location adjacent the front face of the ejector piston; and h) the spiral channels having a first width and being spaced from each other, as measured along the longitudinal length of the tubular piece on which the channels are formed, by a distance about equal to said width of the channels, in order to distribute the plastic melt along the circumference, and such that the plastic melt which is distributed on the circumference of the cylindrical pieces exits from an annular gap (46) that is formed on the front face in the ejector piston (14), so as to enter into the storage space (16).

24. The storage head of claim 23, wherein the width of the spiral channels increases with increasing length from the one end of the tubular piece on which they are formed.

25. A storage head for a blow molding machine for the discontinuous production of plastic hollow bodies, comprising:

a) a storage head housing (10);

b) at least one extruder, connected to the storage-head housing, for feeding at least one molten plastic melt into the storage head;

c) a centrally disposed shaft (12);

d) an ejector piston (14) with a front face;

e) a distributor element (20) formed on said ejector piston (14) as a spiral channel and enclosing the shaft concentrically to distribute the plastic melt over a circular circumference and conduct it into an annular storage space (16) underneath the ejector piston, said piston being mounted in the storage-head housing so as to be movable axially, and by means of which the plastic melt accumulated in the storage space can be ejected intermittently;

f) the ejector piston (14) being formed of at least two concentrically disposed cylindrical tubular pieces (42, 44) with a gap between the two tubular pieces;

g) the spiral channels of the spiral-channel distributor (20) being formed on one tubular piece (42, 44), covered by the other tubular piece (44, 42) and extending from a location adjacent one end of the tubular piece to a location adjacent the front face of the ejector piston; and h) the spiral channels being bounded laterally by defined edges and spaced from each other, as measured along the longitudinal length of the tubular piece on which the channels are formed, by cylindrical surfaces of said tubular piece; and i) a cylindrical surface immediately below the spiral channels being set back radially with respect to a cylindrical surface immediately above the spiral channels.

* * * * *

UNITED STATES PATENT AND TRADEMARK OFFICE
CERTIFICATE OF CORRECTION

PATENT NO. : 5,460,504

DATED : October 24, 1995

INVENTOR(S) : Peter Langos and Manfred Lehmann

It is certified that error appears in the above-identified patent and that said Letters Patent is hereby corrected as shown below:

On the title page, item [30]: Priority data should be added.

June 1, 1990 [DE]  Germany...............P40 17 699

Signed and Sealed this

Thirtieth Day of January, 1996

Attest:

BRUCE LEHMAN

Attesting Officer

Commissioner of Patents and Trademarks